H. F. MOLKENBUR.
TIRE PUMP.
APPLICATION FILED MAY 3, 1915.
1,179,549.
Patented Apr. 18, 1916.
2 SHEETS—SHEET 1.
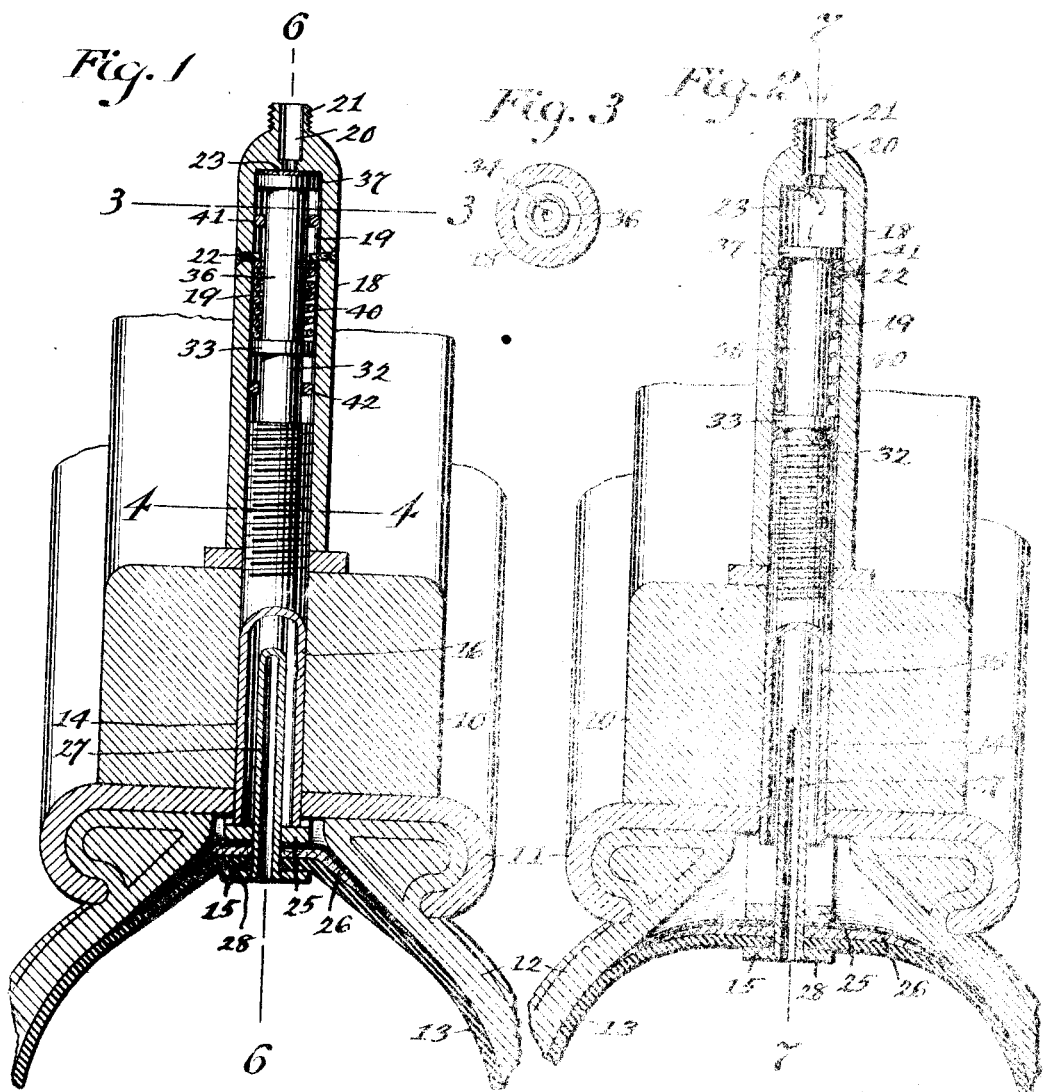
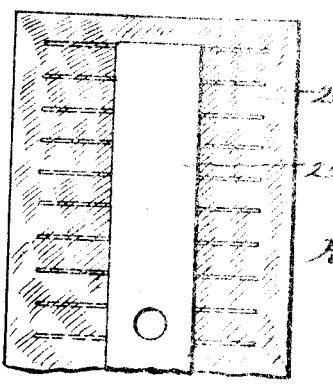
Fig. 5
WITNESSES:
INVENTOR
Henry F. Molkenbur
BY
ATTORNEYS

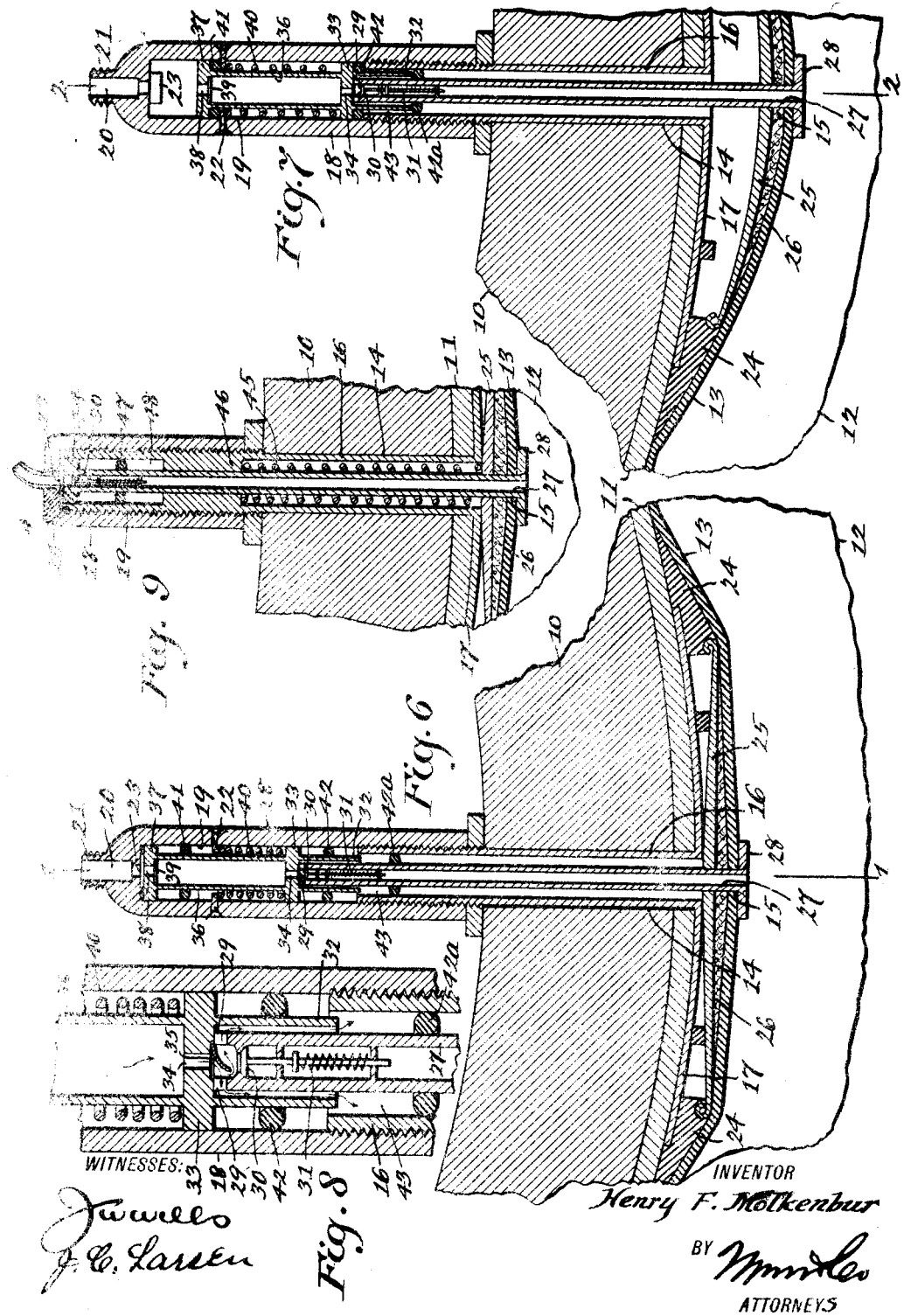

UNITED STATES PATENT OFFICE.

HENRY F. MOLKENBUR, OF ST. PAUL, MINNESOTA.

TIRE-PUMP.

1,179,549.  Specification of Letters Patent.  Patented Apr. 18, 1916.

Application filed May 3, 1915. Serial No. 25,433.

*To all whom it may concern:*

Be it known that I, HENRY F. MOLKENBUR, a citizen of the United States, and a resident of St. Paul, in the county of Ramsey and State of Minnesota, have invented certain new and useful Improvements in Tire-Pumps, of which the following is a specification.

My invention relates to air pumps, and one of the main objects thereof is to provide a pump adapted for connection with pneumatic vehicle tires which will automatically maintain the air within a tire at a desired pressure by taking advantage of the variations from mean pressure while a vehicle is being driven over the usual road inequalities.

My invention is fully described in the following specification, of which the accompanying drawings form a part, in which like characters refer to like parts in each of the views, and in which:—

Figure 1 is a vertical section taken through a pneumatic tire provided with my automatic pump, on the line 1—1 of Fig. 6, with the parts in extreme outer positions; Fig. 2 is a similar view taken on the line 2—2 of Fig. 7, with the parts in innermost positions; Fig. 3 is a section taken on the line 3—3 of Fig. 1; Fig. 4 is a section taken on the line 4—4 of Fig. 1; Fig. 5 is a plan view of a fabric strip and a spring which I employ; Fig. 6 is a section taken on the line 6—6 of Fig. 1; Fig. 7 is a section taken on the line 7—7 of Fig. 2; Fig. 8 is an enlarged, fragmentary, section of the pump mechanism; and Fig. 9 is a view similar to Fig. 6 but showing a modification thereover.

In the drawings forming a part of this application, I have shown a portion of an automobile wheel consisting of a felly 10 having a rim 11 thereon for holding a shoe 12 within which is an inner tube 13, a bore 14 being provided through the felly and rim, and a hole 15 through the inner tube.

In the form shown in Figs. 1 to 8, inclusive, I pass a shell 16 through the bore 14, said shell having a base plate 17 at its outer end resting upon the rim 11 and is screw-threaded externally to receive a detachable cap 18 having a larger bore 19 for the greater part of its length and a bore 20 of lesser diameter at its free end, said cap also having an externally threaded extension 21 thereon and an internal shoulder 22 formed by means of pins, screws, or in any suitable manner, and I also provide a check-valve 23 at the inner end of the bore 20, being merely a spring flap valve in the form shown.

As shown in Figs. 6 and 7, the ends of the base plate 17 rest upon resilient blocks 24 tending to provide a space between the rim 11 and inner tube 13 and serving, also, as supports for the ends of a plate or leaf spring 25 the normal tendency of which is to be outwardly convexed as shown in Fig. 7, but which yields under pressure and is capable of assuming the position shown in Fig. 6, and I provide a strip or pad 26 between the spring 25 and the inner tube 13 to prevent injury to or wear on the latter, this strip or pad being preferably of fabric.

Secured in any desired manner to the spring 25 and passing perpendicularly therethrough is a tube 27 which also passes through the hole 15 in the inner tube and is provided with a flange 28 within said tube locking the inner tube, the spring, and the interposed pad 26 together in such manner as to prevent leakage of air at the hole 15, the tube 27, spring 25, and this portion of the inner tube 13 thus being movable as a unit.

The tube 27 is of considerably less diameter than that of the shell 16 and projects entirely therethrough, the free end thereof having small notches 29 cut therein and also having a valve 30 therein adapted to be opened inwardly of the tube 27 against the action of a coil-spring 31, this being most clearly shown in Fig. 8.

Encircling the free end of the tube 27 is a sleeve 32 forming a part of a flanged piston member 33 fitting closely in the cap 18 and having a port 34 therethrough controlled by a flap valve 35 opening toward and into the tube 27; also forming a part of this member 33 is a cylinder 36 having a similar flanged member 37 on its opposite end provided with a port 38 controlled by a flap valve 39 opening into the cylinder 36, and I interpose a coil spring 40 between the cap shoulder 22 and the flanged member 33 which operates to maintain the member 33 and connected parts in constant contact with the free end of the tube 27.

I interpose a rolling washer 41 between the interior of the cap 18 and the exterior of the cylinder 36, a similar washer 42 between the sleeve 32 and the interior of the cap, and a similar washer 42ᵃ between the interior of the shell 16 and the exterior of the tube 27, these washers being rings of round rubber rolling with the contacting elements as they move with respect to each other and serve to prevent air from passing from one side of each washer to the other side. It will be noted that all the valves open toward the interior of the inner tube, 13, to draw air into said tube in a manner now to be described.

The normal positions of the parts with the inner tube deflated are as shown in Fig. 7, and I may connect the conventional tire pump with the externally threaded extension 21 and inflate the tire in the usual manner until a desired pressure is attained. If this pressure exceeds the strength of the leaf spring 25 said spring is forced into a position of less curvature, possibly flattened into the position shown in Fig. 6, thereby moving the tube 27 toward the open end of the cap 18 and forcing the cylinder 36 toward said cap end against the action of the coil spring 40. This tends to prevent inward opening of the flap valve 23 and further pumping is unnecessary, the parts remaining in these positions as long as this pressure in the inner tube is maintained. However, should leakage occur, the leaf spring 25 and coil spring 40 tend to move the parts toward their normal positions and a curvature of the leaf spring results in the degree of lessened air pressure within the inner tube and a corresponding degree of play is possible to the leaf spring and connected parts.

With the parts in their relaxed or partially relaxed positions due to loss of pressure within the tire, it being assumed that the vehicle on which my pumps are mounted is moving over a road or the like, if the tire is suddenly compressed by striking a stone or other inequality in the road the air pressure within the tire is correspondingly increased and, when the inequality has been passed and the tire again expands into normal position this temporary excess pressure is again lowered to the normal or mean pressure. When the tire was first compressed by such road inequality, the leaf spring 25 was correspondingly moved from normal position, thus forcing the tube 27 and cylinder 36 toward the flap valve 23 and which was closed thereby, the air within the cap adjacent said valve 23 being forced into the cylinder 36, the flap valve 39 opening to permit its passage; when the tire resumed its normal condition, air again passed the flap valve 23 by reason of the fact that the leaf spring had again drawn the tube 27 inwardly and permitted the coil spring 40 to correspondingly move the cylinder 36. Repeated leaf spring actuations because of road inequalities tend to fill the cylinder with air and to compress the air therein in slight degree, the air being allowed to pass the flap valve 35 into the space 43 between the washers 41 and 42 through the notches 29, it being assumed that this air is not of sufficient pressure to overcome the spring valve 30 in the tube 27. However, many such leaf spring movements cause the air to be compressed in the space or chamber 43 until the resistance of said valve 30 is overcome, after which excess air passes to the inner tube, and this continues until the pressure within the inner tube 13 is again sufficiently strong to again force the parts into the positions shown in Fig. 6, wherein there is no leaf spring movement and no air being admitted.

In Fig. 9 is shown a simplification of the structure already described, this modification employing a similar leaf spring 25, pad 26, and tube 27, with the difference that the said tube 27 is flanged at its free end as shown at 44 to fit closely the interior of the free end of the shell 16, much longer in this form, and said shell has a coil spring 45 therein, around the tube 27, bearing between a member 46 on the interior of said shell and the said spring 25, and I also provide a rolling washer 47 in the space 48 between the member 46 and the tube flange 44.

The air within the cap is locked therein when the tube 27 is forced toward the cap end by means of the flap valve 23 and is forced through the tube valve 30 to the inner tube 13, this air movement being direct and being applicable to light vehicles, whereas the air movement in the first form is indirect and entry to the inner tube occurs on the return of the parts to normal positions instead of, as in the second form, on the movement of the parts from normal positions.

In either form the automatic pumping begins as soon as the pressure within the inner tube of the tire falls below the strength of the leaf spring 25 and coil springs coöperating therewith, and pumping continues until the pressure in the tire exceeds the strength of the said springs, at which time the flap valve 23 in the cap is closed.

My invention is very simple in construction and in installation, and requires no alteration in the conventional wheels or tires; it does not interfere with the conventional methods of tire inflation, and presents the same outward appearance as the present valves and caps therefor; it may be readily installed by an unskilled person, and it requires no care or attention after installation, except in the event of a puncture or blowout; the device is comparatively inexpensive, and is well adapted to the purpose for which it is designed, being preferably made of sufficient capacity to take care of ordinary leakage around the valve or even small punctures, thus permitting full enjoyment in riding in a vehicle so provided, except in case of accidents. I may employ a tube 49 to prevent dirt or water getting into the tire, or I may employ a suitable screen over the port 20, if desired.

Having fully described my invention, what I claim as new, and desire to secure by Letters Patent, is:—

1. The combination with a vehicle wheel having a felly, of a tire formed of an annular air tube, a pump in operative connection with said felly and tube, means operable by the variations of air pressure in said tube due to road inequalities for operating said pump, in one direction, and a spring for operating said pump in the opposite direction.

2. The combination with a vehicle wheel having a felly, of a tire formed of an annular air tube, a pump in operative connection with said felly and tube, and means connected with one of the elements of said pump for normally depressing said tube against the pressure of the air therein, said tube depression means being moved out of tube depressing position by the variations of air pressure in said tube due to road inequalities in the movement of said wheel.

3. The combination with a vehicle wheel having a felly, of a tire formed of an annular air tube, a pump shell mounted on said felly, a piston in said shell in operative connection with said tube, and a leaf spring bearing on said felly and normally depressing said tube at its point of connection with said piston.

4. The combination with a vehicle wheel having a felly, of a tire formed of an annular tube, a pump shell mounted on said felly and provided with an inwardly opening valve, a piston in said shell provided with an inwardly opening valve, a tube for operatively connecting said piston with said annular tube, and a leaf spring bearing on said felly and normally depressing said annular tube at its point of connection with said piston tube.

5. The combination with a vehicle wheel having a felly, of a tire formed of an annular tube, a pump shell mounted on said felly, an inwardly opening valve therein, a cylinder slidable in said shell, an inwardly opening valve in said cylinder, a tube projected into said shell and secured to said annular tube to lead air thereto, means for packing said cylinder in said shell, an inwardly opening valve in said tube within said shell, and a leaf spring interposed between said felly and annular tube and normally depressing the latter at its point of connection with said air leading tube.

6. The combination with a vehicle wheel having a felly, of a tire formed of an annular tube, a pump shell on said felly, an inwardly opening valve therein, a cylinder slidably mounted in said shell and closely engaging the walls thereof, an inwardly opening valve in said cylinder, a spring for moving said cylinder toward said tire, a tube secured to said annular tube to lead air thereto projected into said shell, an inwardly opening valve in the outer end of said tube, and a leaf spring interposed between said felly and annular tube to normally depress the latter and hold the valved tube away from the valved end of said shell.

In testimony whereof I have signed my name to this specification in the presence of two subscribing witnesses.

HENRY F. MOLKENBUR.

Witnesses:
   THEODORE H. AICHELE,
   EMIL L. AICHELE.